(12) United States Patent
Baker et al.

(10) Patent No.: US 7,886,667 B1
(45) Date of Patent: Feb. 15, 2011

(54) MORE SAFE INSENSITIVE MUNITION FOR PRODUCING A CONTROLLED FRAGMENTATION PATTERN

(75) Inventors: Ernest Baker, Wantage, NJ (US); Chuck Chin, Ledgewood, NJ (US); Arthur Daniels, Rockaway, NJ (US); Stanley DeFisher, Hackettstown, NJ (US); Vladimir Gold, Hillside, NJ (US); Jack Pincay, Union City, NJ (US); Irene Wu, Livingston, NJ (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 257 days.

(21) Appl. No.: 12/251,611

(22) Filed: Oct. 15, 2008

(51) Int. Cl.
*F42B 12/20* (2006.01)
(52) U.S. Cl. .................. 102/495; 102/481; 102/491; 102/493; 102/494; 102/497; 102/506
(58) Field of Classification Search .......... 102/481, 102/491–497, 506
See application file for complete search history.

(56) References Cited

U.S. PATENT DOCUMENTS

| | | | | |
|---|---|---|---|---|
| 3,491,694 | A * | 1/1970 | Fountain | 102/493 |
| 3,566,794 | A * | 3/1971 | Pearson et al. | 102/493 |
| 3,799,054 | A * | 3/1974 | LaRocca | 102/491 |
| 4,242,960 | A * | 1/1981 | Boeder et al. | 102/506 |
| 4,305,333 | A * | 12/1981 | Altenau et al. | 102/306 |
| 4,312,274 | A * | 1/1982 | Zernow | 102/493 |
| 4,516,501 | A * | 5/1985 | Held et al. | 102/496 |
| 4,655,139 | A * | 4/1987 | Wilhelm | 102/494 |
| 4,658,727 | A * | 4/1987 | Wilhelm et al. | 102/494 |
| 4,662,281 | A * | 5/1987 | Wilhelm et al. | 102/494 |
| 4,664,035 | A * | 5/1987 | Osofsky | 102/493 |
| 4,745,864 | A * | 5/1988 | Craddock | 102/491 |
| 4,776,272 | A * | 10/1988 | Lindstadt et al. | 102/307 |
| 4,823,701 | A * | 4/1989 | Wilhelm | 102/492 |
| 5,313,890 | A * | 5/1994 | Cuadros | 102/496 |
| 5,337,673 | A * | 8/1994 | Koontz et al. | 102/491 |
| 5,375,523 | A * | 12/1994 | Morris | 102/202.9 |
| 5,813,219 | A * | 9/1998 | Gill et al. | 60/223 |
| 6,484,642 | B1 * | 11/2002 | Kuhns et al. | 102/493 |
| 6,615,737 | B2 * | 9/2003 | Bonnel et al. | 102/481 |
| 6,857,372 | B2 * | 2/2005 | Renaud-Bezot et al. | 102/493 |
| 7,114,449 | B2 * | 10/2006 | Altenau | 102/473 |

(Continued)

*Primary Examiner*—Bret Hayes
*Assistant Examiner*—Michael D David
(74) *Attorney, Agent, or Firm*—Michael C Sachs

(57) ABSTRACT

A warhead includes a body, a patterned liner made of plastic, and an explosive charge disposed within the liner. The liner pattern is formed of gaps and liner elements. The explosive charge includes a first set of sections that are disposed adjacent to the liner gaps and a second set of sections that are disposed adjacent to the liner elements. Upon detonation of the explosive charge and because of the temporal delay in transmitting the detonation energy between these two sets of sections, the warhead body is caused to shear and break into fragments with controlled size. The use of plastic as the liner material also provides a welcome safety feature for this warhead. In the event of unwanted heat ignition, the plastic (which is also low melt temperature material), would melt to seal the explosive and would also flow. Because of the plastic, neither sudden pressure nor heat/ignition inside the round, would therefore be as catastrophic.

20 Claims, 7 Drawing Sheets

U.S. PATENT DOCUMENTS

| | | | |
|---|---|---|---|
| 7,451,704 B1 * | 11/2008 | Gold et al. | 102/495 |
| 7,621,222 B2 * | 11/2009 | Lloyd | 102/497 |
| 7,624,682 B2 * | 12/2009 | Lloyd | 102/497 |
| 7,624,683 B2 * | 12/2009 | Lloyd | 102/497 |
| 7,739,956 B2 * | 6/2010 | Ljungwald et al. | 102/481 |
| 7,743,707 B1 * | 6/2010 | Melin et al. | 102/493 |
| 2010/0064926 A1 * | 3/2010 | Melin et al. | 102/481 |

* cited by examiner

MORE SAFE INSENSITIVE MUNITION FOR PRODUCING A CONTROLLED FRAGMENTATION PATTERN

U.S. GOVERNMENTAL INTEREST

The inventions described herein may be manufactured, used and licensed by or for the U.S. Government for U.S. Government purposes.

FIELD OF THE INVENTION

The present invention generally relates to the field of ballistics, and in particular to casings of explosively formed projectiles, shaped charges, and other munitions. More specifically, the present invention pertains to the controlled fragmentation of the munition casing or warhead body.

BACKGROUND OF THE INVENTION

Warhead fragmentation effectiveness is determined by the number, mass, shape, and velocity of the fragments. By using a controlled fragmentation design, warhead fragmentation could generally be achieved quickly and cost effectively. Exemplary controlled fragmentation techniques are described in U.S. Pat. Nos. 3,491,694, 4,312,274, 4,745,864, 5,131,329, and 5,337,673.

In general, conventional designs use "cutter" liners that form fragments by generating a complex pattern of high-velocity "penetrators" for fragmenting the shell. Although these conventional fragmentation designs have proven to be useful, it would be desirable to present additional functional, cost and safety improvements that minimize the warhead weight, reduce manufacture expenses, and advance current United States Insensitive Munition (IM) requirements.

What is therefore needed is a controlled fragmentation technique through the use of a patterned liner which introduces shear stress into the warhead body and creates the desired fragmentation pattern. Fragment size, fragment numbers, and patterns thereof may be influenced through a novel liner configuration. The need for such a controlled fragmentation technique has heretofore remained unsatisfied.

SUMMARY OF THE INVENTION

The present invention satisfies these needs, and presents a munition or warhead such as a projectile, and an associated method for generating a controlled fragmentation pattern (herein referred to as "the invention" or "the present invention").

According to the present invention, warhead fragmentation is achieved more efficiently and more cost effectively than conventional techniques, through the use of a relatively inexpensive formed plastic liner (or liners) with a predetermined pattern of cutouts. According to the present invention, the "shear" and "stamp" liner cutouts generate contours of localized transitional regions with high-gradients of pressures, velocities, strains, and strain-rates acting as stress and strain concentration factors. Unstable thermoplastic shear (adiabatic shear) eventually transfers the entire burden of localized strain to a finite number of shear planes leading to the shell break-up and formation of fragments.

According to one embodiment of the present invention, the warhead includes a liner that is disposed inside the warhead body. The liner includes a predetermined pattern that is created with gaps filled with the warhead's explosive, such allowing the detonation shock wave to directly propagate into the fragmenting case without passing through the liner. As a result, the explosion produces a complex pattern of shear planes in the warhead body, causing the case break-up and formation of fragments with predetermined sizes. This design is distinguishable from existing fragmentation liner technologies that attempt to score or cut the warhead body.

One of the advantages of the present embodiment compared to existing technologies is the cost effectiveness of the manufacturing process of the present design, in that it is faster and more economical to fabricate and to pattern a plastic liner, as opposed to notching or cutting the steel warhead body itself. An advantage of the present invention is that the use of plastic material reduces the overall weight of the warhead compared with use of other materials, as do the gaps which reduce the weight of the liner. But, more important, the use of plastic is a great safety feature. An unwanted ignition of the explosive due to the heat of launch would normally be catastrophic as well as fratricidal. But the plastic of this invention covers the explosive inside the casing body. In the event of unwanted heat/ignition, the plastic (which is also low melt temperature material), would melt to seal the explosive and would also flow. The melted plastic would push out overflows that are usually provided in these rounds. Because of the plastic, neither sudden pressure nor heat/ignition inside the round, would therefore be as catastrophic. Therefore, choice of low-melt temperature plastic as the liner material in this invention, adds safety to the round. This benefit is favorable, consistent with current Insensitive Munition (IM) requirements in minimizing accidental ammunition explosion due to fire hazards.

According to another embodiment of the present invention, the warhead includes a stepped liner that is disposed inside the warhead body. While, as explained earlier, the liner in the previous embodiment includes a pattern that is created with gaps that allows the explosive to expand therein during detonation, the liner of this alternative embodiment, includes a step liner that includes either a uniform or an alternating pattern of raised material on a matrix. This alternative embodiment includes a thin layer of material that replaces the gaps of the previous embodiment.

BRIEF DESCRIPTION OF THE DRAWINGS

The various features of the present invention and the manner of attaining them will be described in greater detail with reference to the following description, claims, and drawings, wherein reference numerals are reused, where appropriate, to indicate a correspondence between the referenced items, and wherein:

DETAILED DESCRIPTION OF PREFERRED EMBODIMENTS

Figure 1:
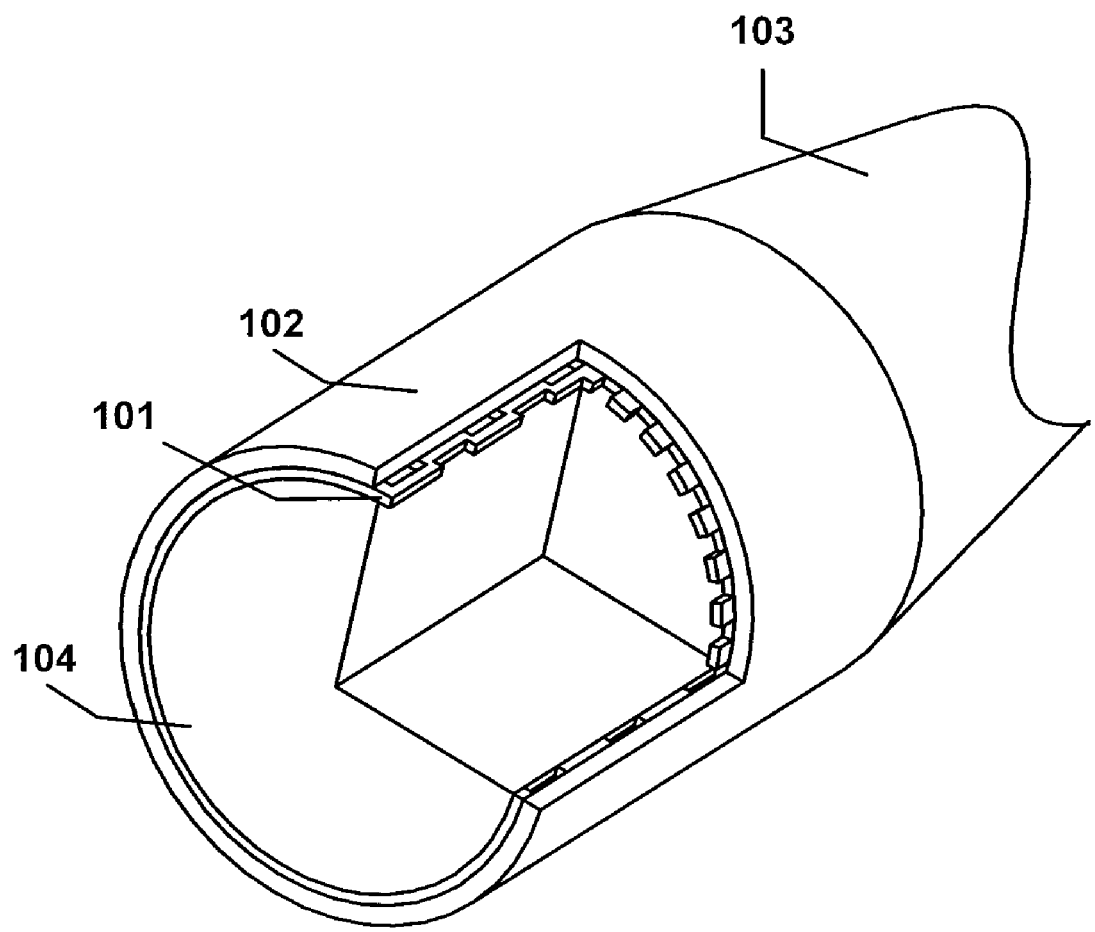
FIG. 1 is a party cutaway, cross-sectional view of a warhead incorporating a liner according to the present invention, to effect controlled fragmentation.
Figure 8:
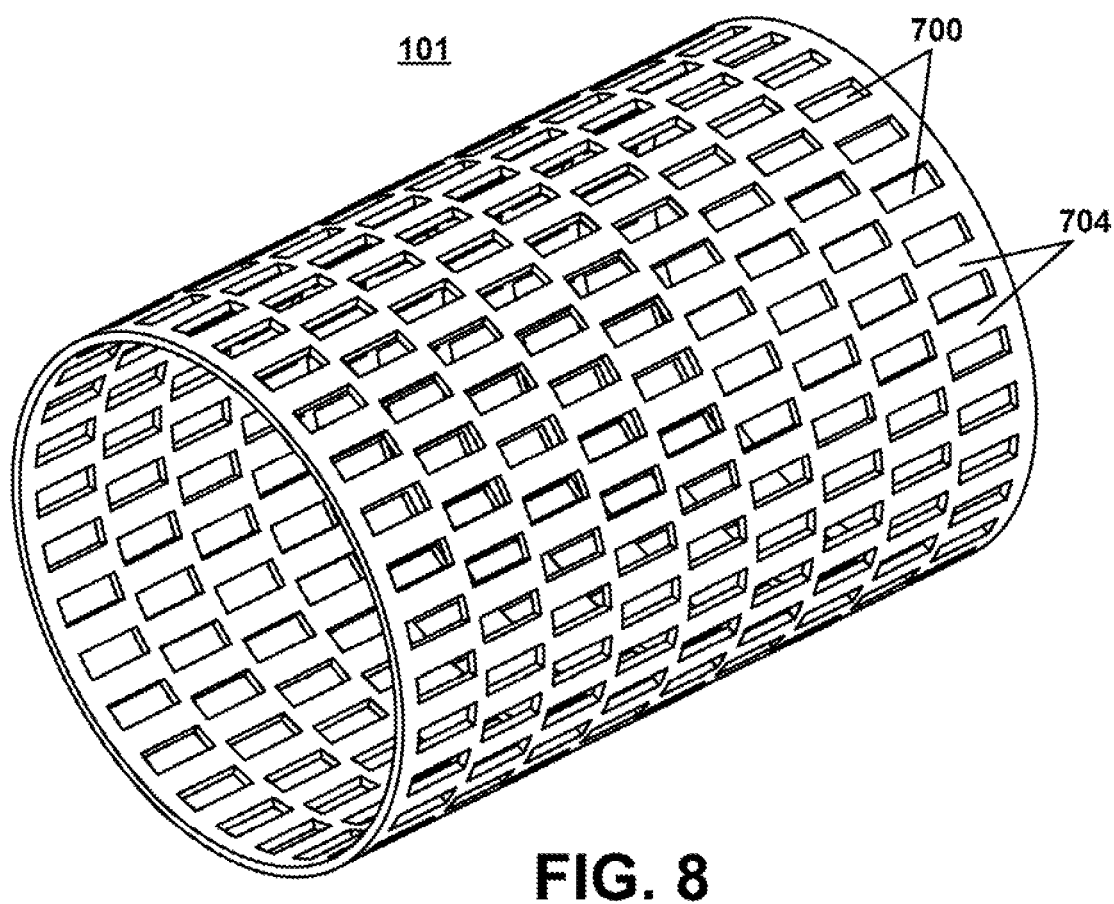
FIG. 8 is a perspective view of the liner according to one embodiment of the present invention.

FIG. 1 illustrates an exemplary embodiment of a warhead, a munition, or a projectile 100 (collectively referenced herein as warhead 100) utilizing a liner 101 that is selectively patterned to effect control fragmentation of a warhead nose 103 or body 102 according to the present invention. The warhead 100 generally comprises the body 102 that houses the liner 101, an explosive or explosive charge 104, back plates (not shown), and an initiation mechanism assembly (not shown). The warhead liner 101 generally takes the shape of the warhead body 102. An exemplary shape of the liner 101 is the cylindrical shape, as illustrated in FIG. 8.

The explosive charge 104 comprises, for example, LX-14, OCTOL, hand packed C-4, or any other solid explosive, that can be machined, cast, or hand-packed to fit snugly within the inside of liner 101.

Figure 2:
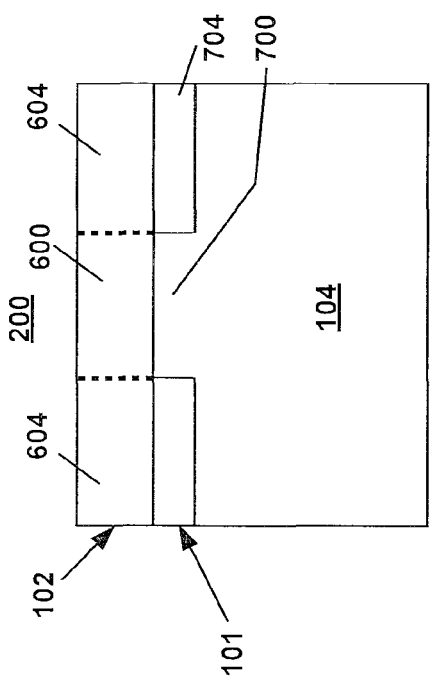
FIG. 2 is an elevational, cross-sectional view of a preferred embodiment of the warhead of FIG. 1, according to the present invention.

FIG. 2 is an elevational, cross-sectional view of the warhead 100 of FIG. 1, according to the present invention, showing a controlled fragmentation pattern 200 of the liner 101. As is illustrated in FIG. 1, while the solid explosive charge 104 does not need to be patterned but just usually plain cylindrical, it could be pre-patterned as one piece but with bumps that fit in the open gaps in correspondence to match the pattern 200 (such as FIGS. 7A-7G) of the liner 101 (such as in FIG. 8).

As further illustrated in more detail in FIG. 7, the pattern 200 of the liner 101 could be formed by any known or conventional method, such as by stamping, or by stereo lithography. The liner 101 could be made of any suitable low-melt temperature material such as HDPE (High Density Poly Ethylene), or Accura SI 40 stereo lithographic material mimicking Nylon 6:6. The pattern 200 includes openings, gaps, or cutouts 700 (collectively referred to herein as gaps 700) that are interposed among a plurality of patterned liner elements 704. The pattern will be described in greater detail in connection with FIG. 7.

Figure 6A:
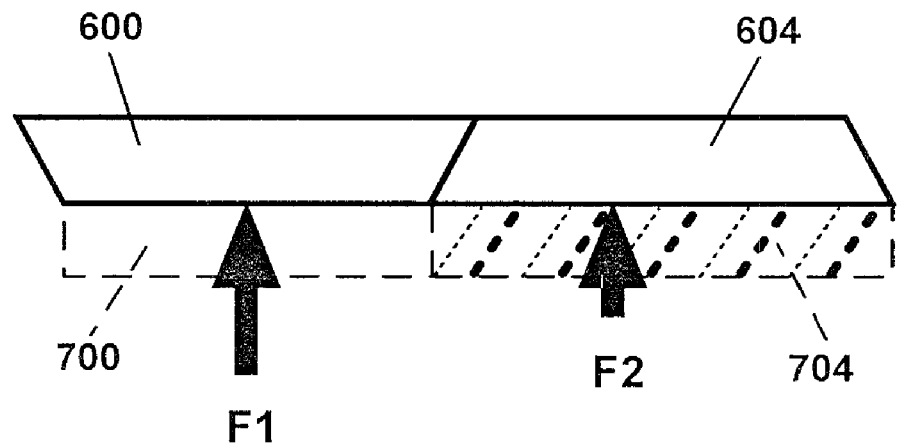
FIG. 6 is comprised of FIGS. 6A and 6B that illustrate the differential shear force application on the warhead body upon detonation of the explosive charge.

With further reference to FIG. 6, upon detonation of the explosive charge 104 of the warhead 100, in the areas of liner cutouts 700, the momentum of the shock wave propagating through the explosive 104 is transmitted directly to the sections 600 of the interior of the warhead body 102, as illustrated by force F1 (FIG. 6A). In the case of the sections 604, which are disposed adjacent to the liner elements 704, the detonation wave momentum is transmitted first to the liner elements 704 and then to the interior of the warhead body 102, as illustrated by force F2 (FIG. 6A).

The time delay between the moments when the shock waves reach sections 600 and 604 is determined by the differences between the detonation velocity of the explosive 104 and the shock wave propagation speed of the liner material 101, respectively. Since the motion of the section 600 should typically start earlier than that of the section 604, the transitional region between section 600 and 604 is subjected to intense "stretching" by the force differential F1–F2, F1>F2. This generates a high gradient of pressures, velocities, and strains between sections 600 and 604, acting as stress and strain "concentration factors".

Figure 6B:
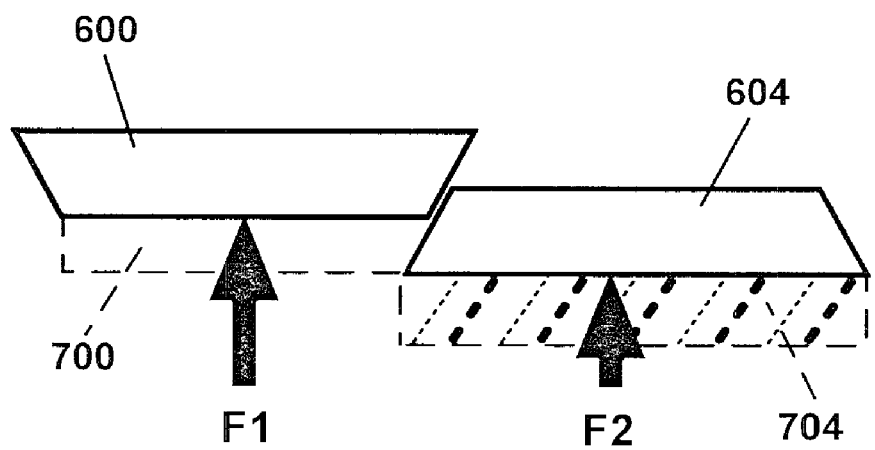

As shown in FIG. 6B, unstable thermoplastic shear (adiabatic shear) eventually transfers the entire burden of localized strain to a finite number of shear planes leading to the shell break-up and formation of fragments. As a result, a predetermined pattern of liner cutouts 700 "stamps out" a pattern of localized transitional regions 600-604, so as to cause the warhead body 102 to shear and break into fragments with controlled size.

For given choices of materials of explosive 104 and liner 101, the thickness of the liner 101 helps determine the time delay between forces F1 and F2, and, subsequently, the magnitude of the required gradients of stresses, strains, and strain-rates in transitional regions 600-604. In a preferred embodiment, the thickness of the liner 101 varies between approximately a fraction of a millimeter and several millimeters, in order to cause a time delay that varies between approximately a hundred of nanoseconds and two microseconds.

The selectively controlled pattern 200 comprises sections of equal size or, alternatively, sections ranging in size from a relatively large size to smaller sections. The larger size of the intact (non-gap) sections is selected for more heavily armored targets, while the smaller size of intact (non-gap) sections is applicable for lightly armored or soft targets. Consequently, the pattern 200 efficiently enables variable and selective lethality of the warhead 100 that can range from maximum lethality for more heavily armored targets to a maximum lethality for lightly armored or soft targets.

FIG. 2 is an elevational, cross-sectional view of a warhead 100 according to one embodiment of the present invention, with the dashed lines illustrating the shearing locations upon detonation of the explosive charge 104, as presented herein. According to this embodiment, the explosive charge 104 completely fills the liner plus is also allowed to fill in, in the gaps 700 of the liner 101 during the manufacture process, so that the explosive charge 104 is in direct contact with the liner 101. Since explosive 104 in gaps 700 is in direct contact with the interior surface of the warhead body 102, the shock wave pressures in sections 600 will be significantly higher than that of sections 604, wherein the shock pressures have been "buffered" with liner elements 704. Accordingly, the material of the warhead body 102 in sections 600 will strain-harden more, attaining higher values of "post-shock" yield strengths than those of sections 604. In general, this will result in high probabilities of fractures occurring in the transition regions 600-604, so as to cause the warhead body 102 to shear and break into fragments in a controlled, predetermined manner.

Figure 3:
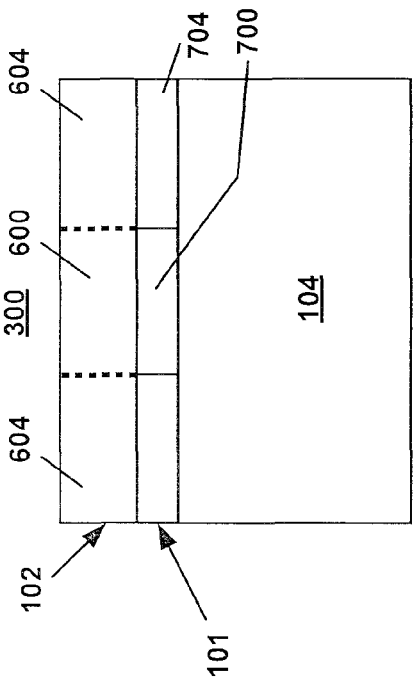
FIG. 3 is an elevational, cross-sectional view of another embodiment of the warhead according to the present invention.

FIG. 3 is a cross-sectional view of the warhead 300 according to another embodiment of the present invention, with the dashed lines illustrating the shearing locations upon detonation of the explosive charge 104, as presented herein. According to this embodiment, the explosive charge 104 is just generally cylindrical and is not allowed to fill the gaps 700 of the liner 101, so that the gaps 700 isolate the explosive charge 104 from the warhead body 102, and form a pattern of internal chambers that can be void, or filled with air, or, alternatively, filed with any other light-density inert gases.

In this embodiment, the gaps 700 extend throughout the depth of the liner 101. Since in this embodiment of the invention the material density of sections 700 is significantly lower than that of sections 704, the shock wave pressures transmitted to sections 600 will be significantly less than that of the neighboring sections 604. Accordingly, the material of the warhead body 102 in sections 604 will have higher "post-shock" yield strengths than that of "void" or "air-gap-buffered" sections 600, so as to cause the warhead body 102 to shear and to break along the transition regions 600-604.

Figure 4:
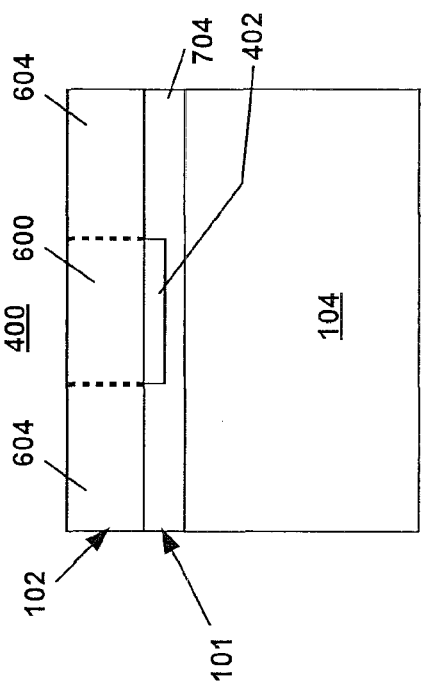
FIG. 4 is an elevational, cross-sectional view of yet another embodiment of the warhead according to the present invention.

FIG. 4 is a cross-sectional view of the warhead 400 according to another embodiment of the present invention, with the dashed lines illustrating the shearing locations upon detonation of the explosive charge 104, as presented herein. According to this embodiment, and similarly to the warhead design of FIG. 3, the explosive charge 104 is not allowed to fill the gaps 402 of the liner 101, so that the gaps 402 isolate the explosive charge 104 from the liner 101. In addition, unlike the gaps 700 that extend throughout the depth of the liner 101, the gaps 402 extend only partially through the depth of the liner 101 and form a stepped configuration with an internal chamber.

Figure 5:
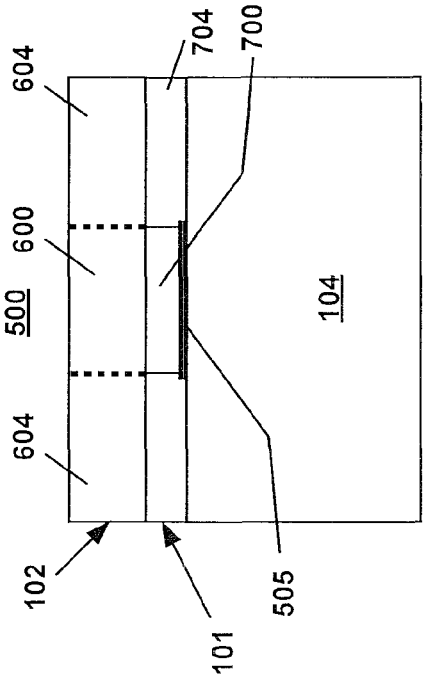
FIG. 5 is an elevational, cross-sectional view of still another embodiment of the warhead according to the present invention.

FIG. 5 is a cross-sectional view of the warhead 500 according to another embodiment of the present invention, with the dashed lines illustrating the shearing locations upon detonation of the explosive charge 104, as presented herein. According to this embodiment, the explosive charge 104 is not allowed to fill the gaps 700 of the liner 101, so that the gaps 700 isolate the explosive charge 104 from the liner 101. In this embodiment, the gaps 700 extend throughout the depth of the liner 101, and are isolated from the explosive charge 104 by means of a metallic liner 505, to form a void, or a gas filled chamber. In a preferred embodiment, the gas is air. The metallic liner 505 is made of a suitable metal, such as aluminum, steel, or copper.

Referring now to FIG. 7, it illustrates various exemplary embodiments of the liner 101. The liner 101 of FIG. 7A is patterned in a checkerboard, circumferential/longitudinal configuration wherein the orientation of the square-shaped gaps 700 is in parallel to the axis 705 of the munition. The gaps 700 and the liner elements 704 are illustrated as being uniform and equal in size. It should be clear that according to another embodiment, the gaps 700 or the liner elements 704 could have different sizes. Though the gaps 700 and liner elements 704 are square-shaped, other shapes are contemplated by the present invention.

Figure 7A:
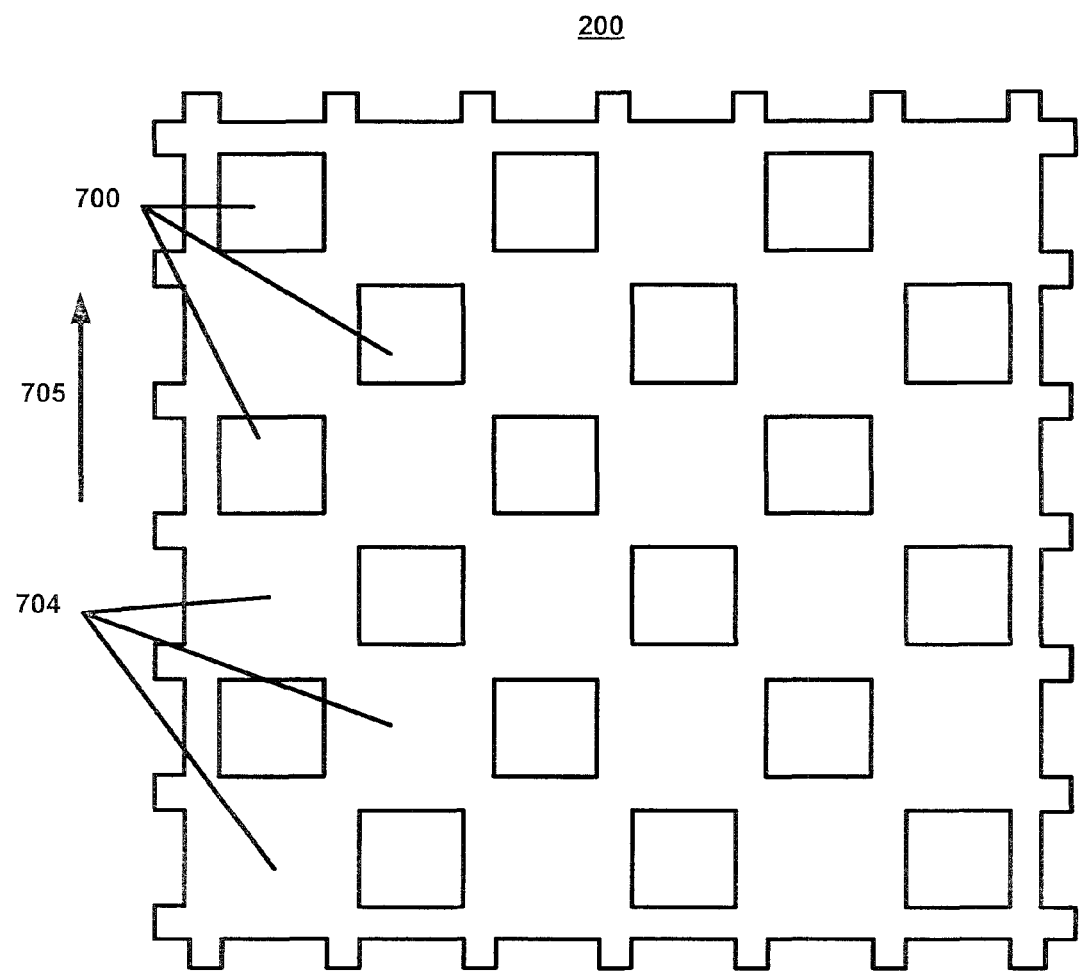
FIG. 7 is comprised of FIGS. 7A, 7B, 7C, 7D, 7E, and 7F that illustrate various exemplary patterns of the liner of the present warhead.
Figure 7B:
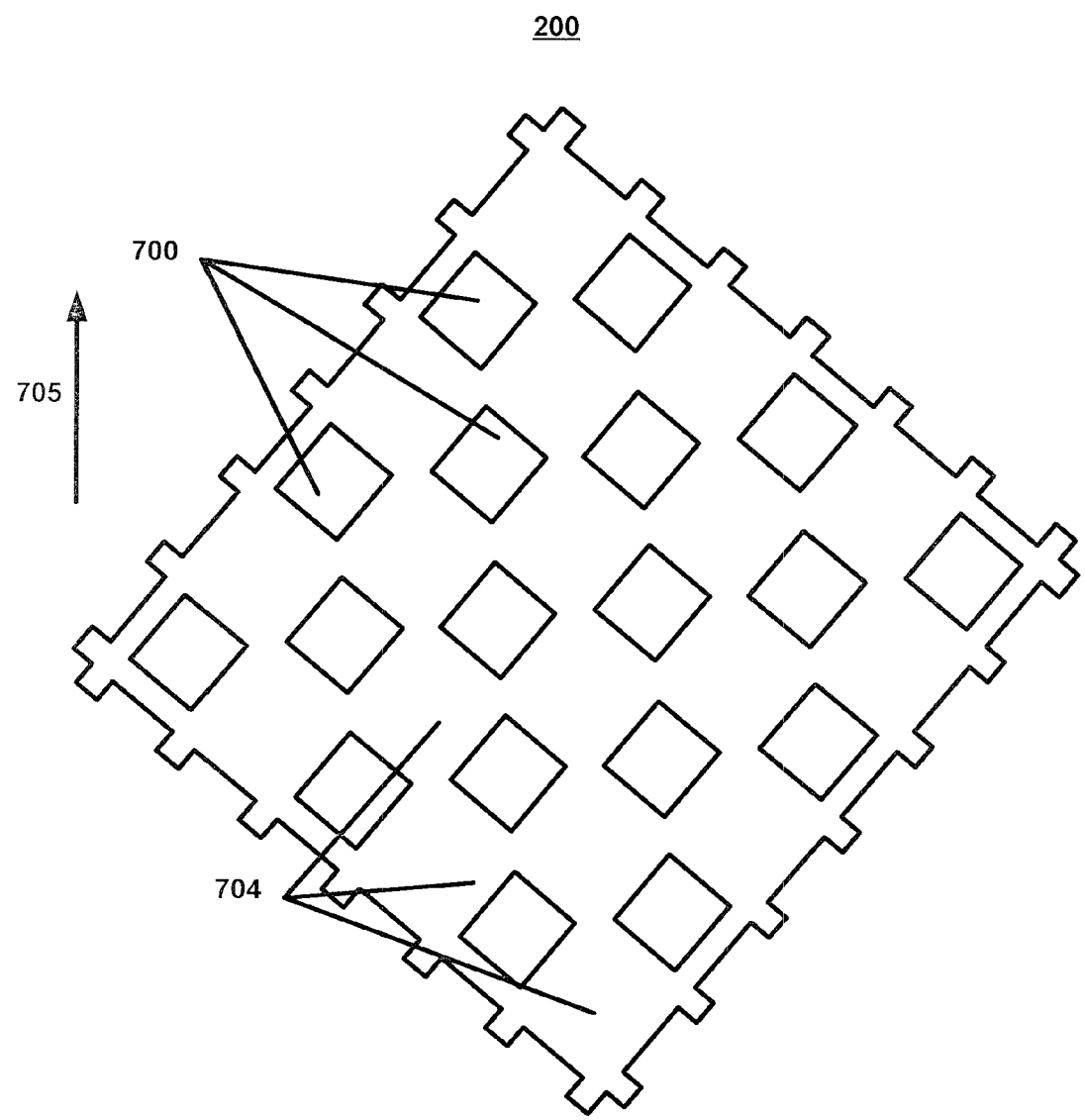
Figure 7C:
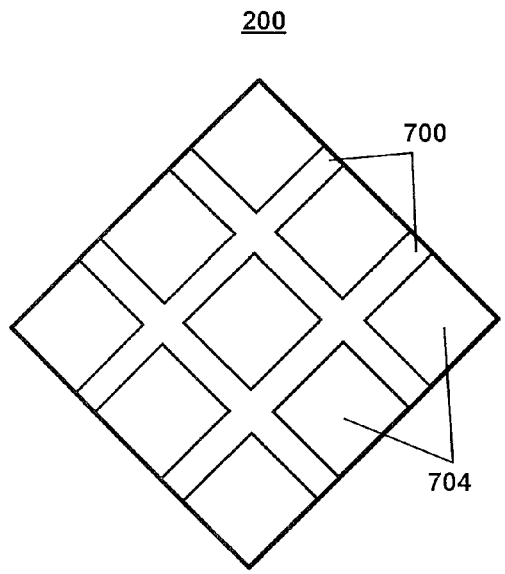
Figure 7D:
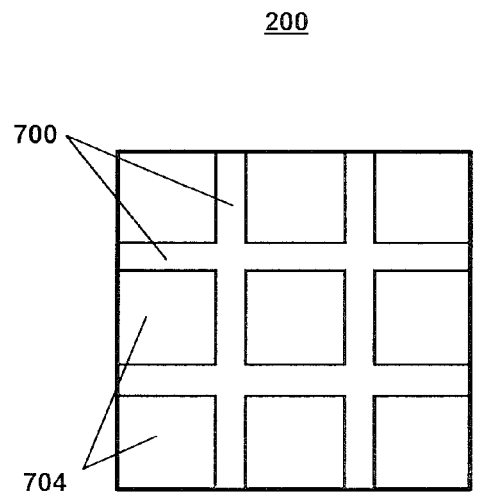
Figure 7E:
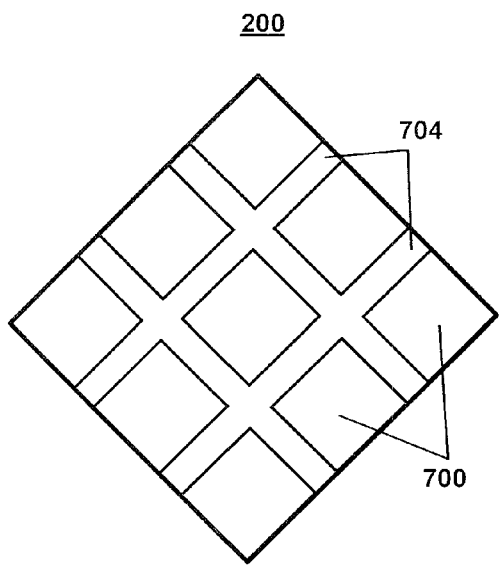
Figure 7F:
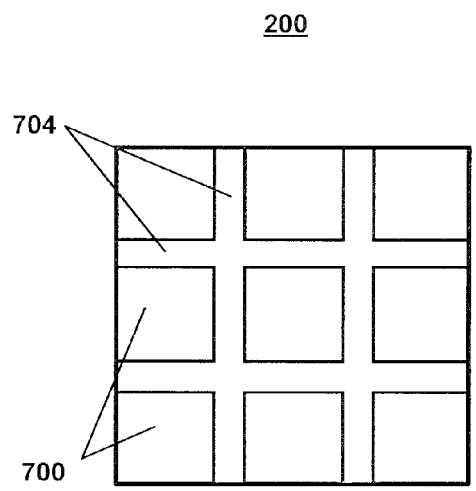

The liner 101 of FIG. 7B is similarly patterned in a checkerboard, configuration, as in FIG. 7A. However, in FIG. 7B, the configuration is a diagonal configuration wherein the orientation of diamond-shaped gaps 700 is at the angle with axis 705 of the munition. The gaps 700 and the liner elements 704 are illustrated as being uniform and equal in size. It should be clear that according to another embodiment, the gaps 700 or the liner elements 704 could have different sizes. Though the gaps 700 and liner elements 704 are diamond shaped, other shapes are contemplated by the present invention.

The liners 101 of FIGS. 7C, 7D, 7E, and 7F illustrate variations to the liner patterns of FIGS. 7A and 7B, by varying the sizes of the gaps 700 relative to the liner elements 704.

Figure 9:
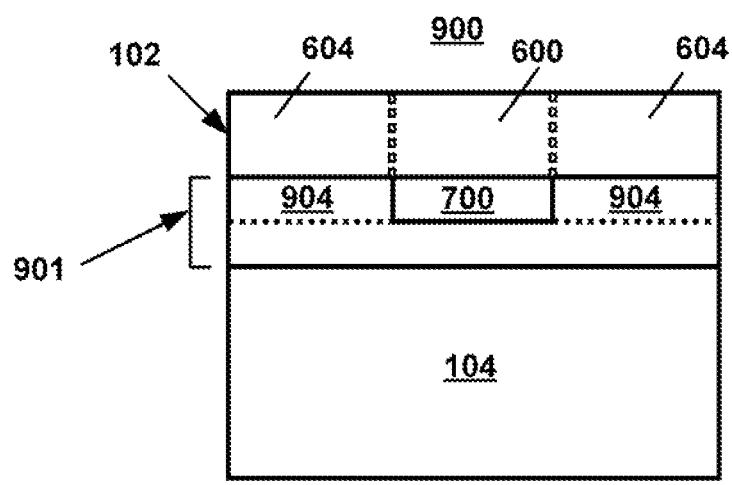
FIG. 9 is an elevational, cross-sectional view of another embodiment of the warhead of FIG. 1, showing a stepped liner.

FIG. 9 illustrates another embodiment of the present invention, and shows a warhead 900 with a stepped liner 901. The warhead 900 includes a stepped liner 901 that is disposed inside the warhead body 102. As explained earlier, the liner 101 in the previous embodiment includes a pattern that is created with gaps 700. The stepped liner 901 is formed of raised sections 904, sunken sections 910, and gaps 700. To this end, the stepped liner 901 is formed of a first liner 101 as described earlier and a second liner 902 that could be either integrally secured to the first liner 101, or integrally formed part thereof similarly to the embodiment of FIG. 4, or have a sliding connection with liner 101.

Also, according to another embodiment, the liner 901 is comprised of two liners such as 101 (with gaps 700), whereas the outer liner can slide between the inner liner 101 and the interior surface of the warhead body 102 in the circumferential direction, as to allow a selectable fragmentation pattern with the desired fragment size that can be "dialed in" by rotation of the outer liner immediately prior to the deployment of the munition.

It is to be understood that the specific embodiments of the invention that have been described are merely illustrative of certain applications of the principles of the present invention. Numerous modifications may be made to the munition with a controlled fragmentation pattern described herein without departing from the spirit and scope of the present invention.

What is claimed is:

1. A cylindrical warhead with controlled fragmentation, comprising:
   a cylindrical liner of plastic material that is formed in a predetermined pattern;
   a cylindrical body that houses the liner;
   a cylindrical explosive charge that is disposed within an interior surface of the liner;
   wherein the liner pattern includes a plurality of gaps and a plurality of liner elements, and wherein the gaps are interposed among the liner elements;
   wherein the explosive charge includes a first set of sections that are disposed adjacent to the liner gaps and a second set of sections that are disposed adjacent to the liner elements;
   wherein upon detonation of the explosive charge, the detonation energy of the first set of sections generates a first force that is transferred directly to the interior of the body;
   wherein upon detonation of the explosive charge, the detonation energy of the second set of sections generates a second force that is transferred to, and dampened by the liner elements, and is transferred therefrom, after a predetermined temporal delay, to the interior of the body; and
   wherein a temporal delay between the first force and the second force and further wherein the dampening by the liner elements, cause the first set of sections and the second set of sections to create a pattern of localized transitional regions of intense stretching with high gradients of pressures, velocities, strains, strain rates, and yield strengths that are generated on the body in different directions, so as to cause the body to shear and break into fragments with controlled size; and
   wherein, in the event of unwanted heat or pressures of launch, the liner plastic melts and flows acting to seal the explosive from catastrophic fratricide, and further the melted plastic also flows to exit the warhead to eliminate pressure within the body.

2. The warhead of claim 1, wherein the explosive charge fills the gaps of the liner so that the explosive charge is in direct contact with the liner.

3. The warhead of claim 1, wherein the gaps isolate the explosive charge from the liner.

4. The warhead of claim 3, wherein the gaps extend through the entire depth of the liner.

5. The warhead of claim 4, wherein the gaps are isolated from the explosive charge by means of a metallic liner.

6. The warhead of claim 3, wherein the gaps extend partially through the depth of the liner to form a stepped configuration.

7. The warhead of claim 1, wherein the liner is patterned in a checkerboard configuration.

8. The warhead of claim 7, wherein the gaps and the liner elements are uniform and equal in size.

9. The warhead of claim 8, wherein the gaps and the liner elements are square shaped.

10. The warhead of claim 8, wherein the gaps and the liner elements are diamond shaped.

11. The warhead of claim 1, wherein the liner is cylindrically shaped.

12. The warhead of claim 1, wherein the liner is made of a low melt-temperature plastic material to facilitate heat-induced melt out, further enhancing ammunition resistance to fire hazards.

13. The warhead of claim 1, wherein the explosive charge is patterned.

14. The warhead of claim 1, wherein the explosive charge lacks patterning.

15. The warhead of claim 1, wherein the warhead includes any one of an explosively formed projectile and a shaped charge liner.

16. The warhead of claim 1, wherein the controlled size is selectable so as to allow a selectable fragmentation pattern with one or more desired fragment sizes that predetermined prior to deployment.

17. A cylindrical warhead with controlled fragmentation, comprising:
    a cylindrical liner of plastic material that is formed in a predetermined pattern;
    a head;
    a cylindrical body that houses the liner;
    a cylindrical explosive charge that is disposed within an interior surface of the liner;
    wherein the liner pattern includes a plurality of gaps and a plurality of liner elements, and wherein the gaps are interposed among the liner elements;
    wherein the explosive charge includes a first set of sections that are disposed adjacent to the liner gaps and a second set of sections that are disposed adjacent to the liner elements;
    wherein upon detonation of the explosive charge, the detonation energy of the first set of sections generates a first force that is transferred directly to any of the body or head;
    wherein upon detonation of the explosive charge, the detonation energy of the second set of sections generates a second force that is transferred to, and dampened by the gaps, and is transferred therefrom, after a predetermined temporal delay, to said any of the body or head; and
    wherein a temporal delay between the first force and the second force and further wherein the dampening by the gaps, cause the first set of sections and the second set of sections to create a pattern of localized transitional regions of intense stretching with high gradients of pressures, velocities, strains, strain rates, and yield strengths that are generated on the body in different directions, so as to cause the body to shear and break into fragments with controlled size; and
    wherein, in the event of unwanted heat or pressures of launch, the liner plastic melts and flows acting to seal the explosive from catastrophic fratricide, and further the melted plastic also flows to exit the warhead to eliminate pressure within the body.

18. The warhead of claim 17, wherein the controlled size is selectable so as to allow a selectable fragmentation pattern with one or more desired fragment sizes that predetermined prior to deployment.

19. A cylindrical warhead with controlled fragmentation, comprising:
    a cylindrical liner of plastic material that is formed in a predetermined pattern;
    a cylindrical warhead section that houses the liner;
    a cylindrical explosive charge that is disposed within an interior surface of the liner;
    wherein, said liner is comprised of a first cylindrical liner which encompasses the explosive charge and a second liner which encompasses said first liner, said second liner having a design thereon of gaps and full sections;
    wherein the liner pattern includes a plurality of stepped liner elements that comprise raised liner elements and sunken liner elements;
    wherein the explosive charge includes a first set of sections that are disposed adjacent to the raised liner elements and a second set of sections that are disposed adjacent to the sunken liner elements;
    wherein upon detonation of the explosive charge, the detonation energy of the first set of sections generates a first force that is transferred to the warhead section through the sunken liner elements, and through through gaps;
    wherein upon detonation of the explosive charge, the detonation energy of the second set of sections generates a second force that is transferred to the raised liner elements, and is transferred therefrom to the warhead section; and
    wherein a temporal delay between the first force and the second force and further wherein a dampening action in the sunken liner elements, cause the first set of sections and the second set of sections to create a pattern of localized transitional regions of intense stretching with high gradients of pressures, velocities, strains, strain rates, and yield strengths that are generated on the body in different directions, so as to cause the body to shear and break into fragments with controlled size; and
    wherein, in the event of unwanted heat or pressures of launch, the liner plastic melts and flows acting to seal the explosive from catastrophic fratricide, and further the melted plastic also flows to exit the warhead to eliminate pressure within the body.

20. The warhead of claim 19, wherein the controlled size is selectable so as to allow a selectable fragmentation pattern with one or more desired fragment sizes that predetermined prior to deployment.

\* \* \* \* \*